United States Patent
Zhou et al.

(10) Patent No.: US 10,516,194 B2
(45) Date of Patent: Dec. 24, 2019

(54) THERMAL MANAGEMENT SOLUTION FOR BATTERY PACK

(71) Applicant: Toyota Motor Engineering & Manufacturing North America, Inc., Erlanger, KY (US)

(72) Inventors: Feng Zhou, South Lyon, MI (US); Ercan Mehmet Dede, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 289 days.

(21) Appl. No.: 14/931,525

(22) Filed: Nov. 3, 2015

(65) Prior Publication Data

US 2017/0125866 A1    May 4, 2017

(51) Int. Cl.
*H01M 10/613*    (2014.01)
*H01M 10/6569*    (2014.01)
(Continued)

(52) U.S. Cl.
CPC ....... *H01M 10/6569* (2015.04); *H01M 10/60* (2015.04); *H01M 10/613* (2015.04); *H01M 10/625* (2015.04); *H01M 2220/20* (2013.01)

(58) Field of Classification Search
CPC ............................ H01M 10/60; H01M 10/613
See application file for complete search history.

(56) References Cited

U.S. PATENT DOCUMENTS

| 7,960,943 B2 | 6/2011 | Gamboa et al. |
| 8,716,689 B2 | 5/2014 | Chen et al. |
| (Continued) | | |

FOREIGN PATENT DOCUMENTS

| CN | 20258989 U | * | 2/2013 |
| CN | 104650814 A | * | 5/2015 |
| WO | WO 2015/107106 A1 | | 7/2015 |

OTHER PUBLICATIONS

Ahmad A. Pesaran, "Battery Thermal Management in EVs and HEVs: Issues and Solutions", Advanced Automotive Battery Conference, Las Vegas, Nevada, Feb. 6-8, 2001.
(Continued)

*Primary Examiner* — Keith M Raymond
*Assistant Examiner* — Nael N Babaa
(74) *Attorney, Agent, or Firm* — Oblon, McClelland, Maier & Neustadt, L.L.P.

(57) ABSTRACT

A thermally managed electrical supply unit is provided. The unit contains an energy unit comprising a battery or a battery pack; a casing of a porous thermally conductive framework comprising a phase change material on at least one surface of the energy unit; at least one heat flux rectifier unit on the thermally conductive framework casing; wherein a surface of the heat flux rectifier opposite to the PF/PCM casing is subject to cooling. Also provided is a method for thermal management of an energy unit comprising absorption of heat from the energy unit within a phase change material, transfer of the heat energy from the phase change material through a heat flux rectifier and removal of the heat transferred across the heat flux rectifier. The flow of heat across the heat flux rectifier is irreversible and the heat flux rectifier acts as an on/off switch to control the heat flow.

19 Claims, 5 Drawing Sheets

(51) Int. Cl.
*H01M 10/625* (2014.01)
*H01M 10/60* (2014.01)

(56) References Cited

U.S. PATENT DOCUMENTS

| | | |
|---|---|---|
| 2008/0128116 A1 | 6/2008 | Dangelo et al. |
| 2008/0202729 A1* | 8/2008 | Mochizuki .......... F28D 15/0233 165/104.14 |
| 2010/0201241 A1* | 8/2010 | Weaver ................ F21V 29/004 313/46 |
| 2012/0012804 A1* | 1/2012 | Chen .................. F28D 15/0233 257/2 |
| 2014/0030458 A1* | 1/2014 | Van Eibergen ......... C08L 83/04 428/36.8 |
| 2015/0114617 A1* | 4/2015 | Yang ...................... F28F 3/048 165/287 |
| 2015/0207133 A1 | 7/2015 | Holl et al. |

OTHER PUBLICATIONS

Said Al-Hallaj et al., "Passive Thermal Management Using Phase Change Material (PCM) for EV and HEV Li-ion Batteries" (2005).
Nenad Miljkovic and Evelyn N. Wang, "Condensation heat transfer on superhydrophobic surfaces", MRS Bulletin 38(05):397-406 (2013).
Jonathan B. Boreyko, Yuejun Zhao, and Chuan-Hua Chen, "Planar jumping-drop thermal diodes," Applied Physics Letters 99:234105 (2011).
Nicholas R. Jankowski, F. Patrick McCluskey, "A review of phase change materials for vehicle component thermal buffering", Applied Energy 113:1525-1561 (2014).
T. Hirayanagi et al., "Micro Thermal Diode with Glass Thermal Insulation Structure Embedded in Vapor Chamber", Journal of Physics: Conference Series 476:012019) (2013).
Jonathan B. Boreyko, Chuan-Hua Chen, "Vapor chambers with jumping-drop liquid return from superhydrophobic condensers", International Journal of Heat and Mass Transfer 61:409-418 (2013).

* cited by examiner

THERMAL MANAGEMENT SOLUTION FOR BATTERY PACK

BACKGROUND

Development of electric vehicles (EVs) and hybrid electric vehicles (HEVs) is in the forefront of automotive research and recent advances in the industry have led to such vehicles in commercial utilization. Ongoing efforts to provide vehicles having the power and range of combustion engine based vehicles have led to advancement of energy units as power supply. New electrical energy charge and discharge systems are under investigation as well as methods of improvement of capacity of conventional battery systems. One issue identified as important to performance of battery modules or battery packs is thermal management of the unit.

Thermal management is very critical to maintain the performance of the battery pack of an electrified vehicle. There are two main issues related to the thermal stress to the battery pack. The first is that the high temperature during charge and discharge will lead to the possibility that temperatures will exceed permissible levels and decrease the battery performance. The second is that uneven temperature distribution in the battery pack will lead to localized hot spots and subsequent deterioration. Temperature uniformity, within a cell and from cell to cell, is important to achieve maximum cycle life of the individual cells, the module and the battery pack. Conventionally, a thermal management system may be passive (i.e., only the ambient environment is used) or active (i.e., a built-in source provides heating and/or cooling), and can be also divided into four categories based on medium:
  (i) Air for heat/cooling/ventilation;
  (ii) Liquid for cooling/heating;
  (iii) Phase change materials (PCM).
  (iv) Combination of above.

Thermal management of batteries employing conventional systems (i) and (ii) are reviewed by Pesaran (Advanced Automotive Battery Conference, Las Vegas, Nev., Feb. 6-8, 2001). A review of the use of phase change materials and their utility for thermal management of vehicle components is provided by Jankowski et al. (Applied Energy, 113 (2014) 1525-1561)

Air forced convection cooling could mitigate temperature rise in the battery. However, if the battery temperature rises higher than 66° C., it would be difficult to cool it to below 52° C. by air-cooling, especially when the ambient temperature is high (i.e. greater than 40° C. such as in a desert environment). Furthermore, at stressful and extreme use conditions, especially at high discharge rates, air-cooling will not be sufficient, and non-uniform distribution of temperature on the surface of the battery becomes inevitable.

Liquid cooling requires complicated systems and potential leak of the coolant is always a concern. Such systems add weight to the vehicle and require maintenance. Economic impact on the total cost of the vehicle is also to be considered.

Phase change material systems offer certain advantages over air and liquid coolant systems which include reduced peak temperatures, better temperature uniformity, and reduced system volume. However, PCM systems lead to heat accumulation and significant additional weight. The heat accumulated within the phase change material still needs to be dissipated into environment via other cooling methods, such as air cooling.

Accordingly, there is a need for an effective and efficient thermal management system especially for battery packs for electric vehicles. The thermal management system should contribute minimum weight to the vehicle and should occupy minimum space relative to the size of the battery pack. It should require minimum or no maintenance and should contribute only incremental cost increase to the total cost of the vehicle. An object of this disclosure is to provide a thermal management method and system which meets these needs.

SUMMARY

These and other objects are provided in the present disclosure, the first embodiment of which provides a thermally managed electrical supply unit, comprising: an energy unit comprising a battery, a battery pack or a fuel cell; a casing of a porous thermally conductive framework comprising a phase change material (PF/PCM) on at least one surface of the energy unit; at least one heat flux rectifier unit on the thermally conductive framework casing; wherein a surface of the heat flux rectifier opposite to the PF/PCM casing is subject to cooling by at least one selected from the group consisting of contact with a supply of a fluid coolant flow across the surface, convection cooling to an environment of the thermally managed electrical supply unit and radiant heat loss.

In one variant of this embodiment of the thermal management system the casing of the porous thermally conductive framework substantially surrounds and encloses the energy unit, a layer of a plurality of individual heat flux rectifier units arranged on the surface of the casing away from the battery pack encloses the encased energy unit and the layer of a plurality of heat flux rectifier units is cooled either by active cooling or by passive cooling.

In a further embodiment the present disclosure provides a method for thermal management of an energy unit, comprising: absorption of heat from the energy unit within a phase change material; transfer of the heat energy from the phase change material through a heat flux rectifier; and removal of the heat energy transferred across the heat flux rectifier; wherein the flow of heat across the heat flux rectifier is irreversible and the heat flux rectifier acts as an on/off switch to control heat flow.

The foregoing paragraphs have been provided by way of general introduction, and are not intended to limit the scope of the following claims. The described embodiments, together with further advantages, will be best understood by reference to the following detailed description taken in conjunction with the accompanying drawings.

DESCRIPTION OF THE EMBODIMENTS

The inventors have recognized that to efficiently and effectively manage the thermal stress of high energy supply units having the energy capacity required for future electric vehicles, conventional systems based upon fluid cooling or phase change material (PCM) are not satisfactory.

Under high thermal stress conditions air cooling is simply not sufficient to maintain and regulate the battery pack temperature.

Phase change systems offer greater thermal energy management potential. When the temperature of the energy unit module exceeds the melting point of the PCM, the PCM starts to melt and the absorbed high latent heat of the PCM removes the thermal energy from the heat source and prevents the temperature of the source from rising sharply. However, if only the PCM is available to absorb and dissipate all the thermal energy generated by an energy unit such as a battery pack or fuel cell, a large mass of PCM would be required to absorb the amount of heat energy generated, as indicated by the following formula:

$$M_{PCM} = \frac{Q_{dis}}{c_p(T_m - T_i) + h}$$

where, $Q_{dis}$ (J) is heat of battery release; $M_{PCM}$ (kg) is the quality of PCMs; $c_p$ (J kg$^{-1}$ K$^{-1}$) is the specific heat of PCMs; $T_m$ (° C.) is the temperature of the melting point; $T_i$ (° C.) is the initial temperature of PCMs; h (J kg$^{-1}$) is the phase change latent heat of PCMs. The high weight of PCM required would adversely affect the efficiency and weight of the vehicle. Moreover, there must be some mechanism to dissipate the heat absorbed by the PCM to the environment and thus avoid accumulation of the heat within the battery package.

Therefore, the inventors have studied various thermal energy control systems and combinations of those systems and have surprisingly discovered that if external fluid cooling and phase change material components are combined together with a heat flux rectifier unit sandwiched in between, an effective and efficient thermal management systems results.

The composite system described in the embodiments of this disclosure provides a management solution for thermal protection and thermal modulation of an energy unit as may be exemplified by a battery, a battery pack or a fuel cell. The design insulates the heat within the composite system at low temperature while dissipating heat from the energy unit when the unit is at an elevated temperature. The effective thermal conductivity at high temperatures could be more than 100 times higher than that at low temperatures. Moreover, the heat flux rectifier design can effectively release the heat while shielding the battery package from external heat when present in a harsh thermal environment. The system according to the various embodiments disclosed herein eliminates local hot spots of the battery pack and promotes the maintenance of a uniform temperature within the energy unit. The amount of PCM employed to achieve uniform thermal management may be significantly reduced in comparison to conventional stand-alone PCM systems and as a result, the total weight of the thermal management system may be minimized. The design may additionally enhance warm-up of the battery pack at cold start.

Thus the first embodiment of the present disclosure provides a composite system for thermally managing an electrical supply unit. The composite system includes an energy unit comprising a battery, battery pack or fuel cell; a casing of a porous thermally conductive framework containing a phase change material which is in thermal communication with the energy unit on at least one side of the battery pack; at least one heat flux rectifier unit on the thermally conductive framework casing and in thermal contact with the phase change material; and a supply of a fluid coolant flow across an outer surface of the heat flux rectifier.

In one variant of this embodiment the casing of porous thermally conductive framework containing the PCM substantially surrounds and encloses the energy unit, a layer of a plurality of individual heat flux rectifier units arranged on the surface of the casing away from the energy unit encloses the encased unit and the layer of a plurality of heat flux rectifier units is air cooled.

Throughout this disclosure, the term "energy unit" is used to describe and include electrical current supply devices such as a battery, a battery module, battery pack or fuel cell. The terms battery, module and battery pack may be used interchangeably throughout this disclosure. The type of energy unit is not limited as the thermal management system disclosed is arranged external to the energy unit and does not interact with the chemical process of the unit other than thermal management via thermal transfer of heat away from the battery as required.

In special embodiments, the energy unit may be a lithium ion battery, a magnesium ion battery, a valve regulated lead acid battery, a nickel metal hydride battery or a fuel cell.

Figure 1:
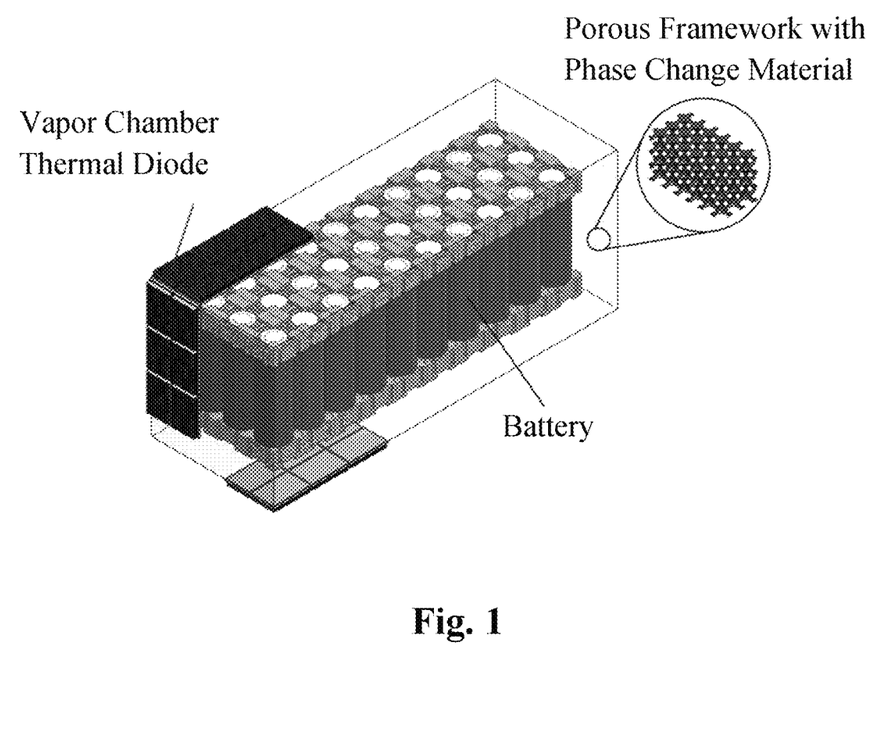
FIG. 1 shows a schematic diagram of the thermal management system of one embodiment.

A schematic view of the battery thermal management concept of this disclosure is shown in FIG. 1. The energy unit or battery pack is enclosed within a casing of a porous framework (PF) containing a phase change material (PCM) such as, for example, a paraffin wax that has a melt temperature at the optimum operation temperature of the battery. The porous framework (PF) is made of a material of high thermal conductivity (i.e., metal, graphite, etc.) such that efficient heat conduction from the battery pack to the phase change material and the heat distribution within the PCM may be achieved. The PCM/PF casing outer surface (the surface opposite to the battery pack) is in contact physically and thermally with an interior surface of at least one heat flux rectifier unit. The exterior surface of the heat flux rectifier which is furthest from the PCM/PF casing is externally fluid cooled and may be integrated with fin structure to dissipate heat to the external environment.

In one variant of the embodiment, the external environment cooling may be accomplished simply by air cooling either via a passive air system or an active system where a forced flow of air is provided, for example by a fan unit.

In a further variant, the external environment cooling may be accomplished by flowing a fluid other than air across the exterior surface of the heat flux rectifier. The fluid may be a gaseous composition other than air such as nitrogen, argon or mixtures of gases which are non-corrosive to the fin surface. The fluid may also be a liquid material which is flowed either actively across the surface of the heat flux rectifier such as by a pump system or simply by cascade flow from an outlet arrangement above the unit. Any liquid which is non-corrosive and stable to the environment of the thermally managed energy unit may be used. In a preferred aspect of this variant, the liquid may be water or a glycol water mixture such as employed in a radiator system.

In a further aspect, the external environment cooling may be accomplished by radiant heat loss via convection to the adjacent atmosphere or radiant heat loss to an inert atmosphere, such as, for example, where the energy unit is in space.

The PCM/PF casing is capable of removing large quantities of heat due to the high latent heat of fusion of the PCM and the effective thermal conductivity of the material of the PF.

An advantage of the system design described in this application is that the PCM/PF casing is not required to absorb and retain all the heat generated by the energy unit, but acts to transfer the thermal energy away from the battery pack by the thermal communication with the heat rectifier unit. Consequently, the mass of PCM required is considerably reduced in comparison to conventional PCM systems, and an efficient thermal management system having comparatively less weight may be obtained.

PCM materials useful in the present embodiments may be commercially available and include salt hydrates, paraffins (waxes) and biobased organic compounds derived from animal fats or plant oils. Each of the different phase change materials may be characterized by distinct advantages and disadvantages. One of skill in the art may formulate a phase change system which meets the requirements of the system to be managed by selection of an appropriate phase change material.

Salt hydrates are aqueous mixtures of inorganic salts and depending upon the particular salt and concentration may be prepared to have a melt point temperature from 15° C. to 80° C. Such materials are of relatively low cost, are inflammable and have high latent heat storage capacity. However, the salts may be toxic, are generally corrosive to metals and have a limited freeze/thaw cyclic lifetime.

Paraffins offer a more limited melt point range (−8° C. to 40° C.) and may be considered hazardous to human health and the environment. However, they are noncorrosive and compatible with materials typically used for the porous framework (PF).

The PCM's derived from animal fats or plant oils offer the greatest range of melt point temperatures (−40° C. to 151° C.), are nontoxic and fire resistant and in contrast to the salt hydrates have minimal volume change between solid and liquid phases.

A comprehensive listing of PCMs is provided in Jankowski as previously referenced.

In preferred variants the melting point of the phase change material may be from 20° C. to 80° C., preferably 25° C. to 60° C. and most preferably 30° C. to 50° C.

The porous framework material may be commercially available and may comprise a thermally conductive graphite foam or a thermally conductive metal foam. Most commonly available metal foams are either aluminum or copper. However, the PF is not limited to these metals and foams based on tin, zinc, nickel, Inconel, silver and gold may be suitable. Alloy mixtures of any of these may also be suitable. Carbon foams may also be suitable as a PF material. In one embodiment the carbon foam may be a reticulated vitreous carbon having an open cell structure. Whether metal based or carbon based the open cell foam or sponge structure provides a repository for the PCM and must be compatible with the PCM, as well as be structurally stable to stress due to volume increase during phase conversion. In such an open cell structure, the cells may interconnect to provide porosity to the PF which is isotropic.

Another structure which may be suitable as a PF may be a honeycomb structured material based on hexagonal cells formed of the same composition as described above for the open cell PF materials. Such structures are anisotropic and the hexagonal cell channels may be oriented in any direction relative to the axis of direction of heat transfer from the PCM/PF casing to the heat flux rectifier unit or units.

Figure 3:
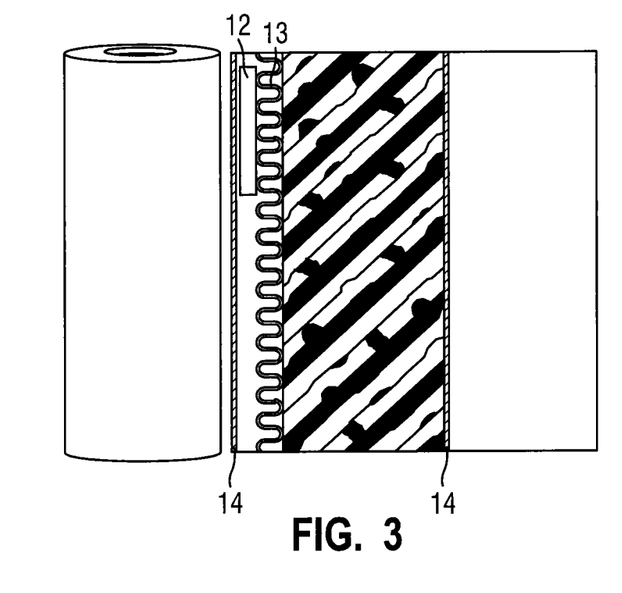
FIG. 3 shows a schematic view of the system wherein specific modifications of the casing of the porous thermally conductive framework are illustrated.

Thin metallic sheets or foils may be placed on the surface of the PCM/PF casing to assure that the melted PCM is retained within the porous framework and to prevent moisture or other contaminants from entering the porous structure. A foil of high thermal transfer is employed to assist thermal transfer between the heat flux rectifier and the PCM/PF casing. A foil (14) is shown in FIG. 3.

Heat flux rectifiers are described in references such as Hirayanagi et al. (Journal of Physics: Conference Series, 476 (2013) 012019); Boreyko et al. (International Journal of Heat and Mass Transfer, 61 (2013) 409-418); Miljkovic et al. (MRS Bulletin, Vol. 38, May 2013, 397-406) and the references cited therein. The contents of each of the listed articles are incorporated herein by reference in their entirety.

The heat flux rectifier comprises: a superhydrophilic side adjacent to the casing of the phase change material, a superhydrophobic side on the side of the heat flux rectifier distant from the casing of the phase change material, thermal exchange fins on the outer surface of the superhydrophobic side, and a solvent coolant capable of vaporization and condensation between the superhydrophilic side and the superhydrophobic side of the heat flux rectifier unit.

Figure 2:
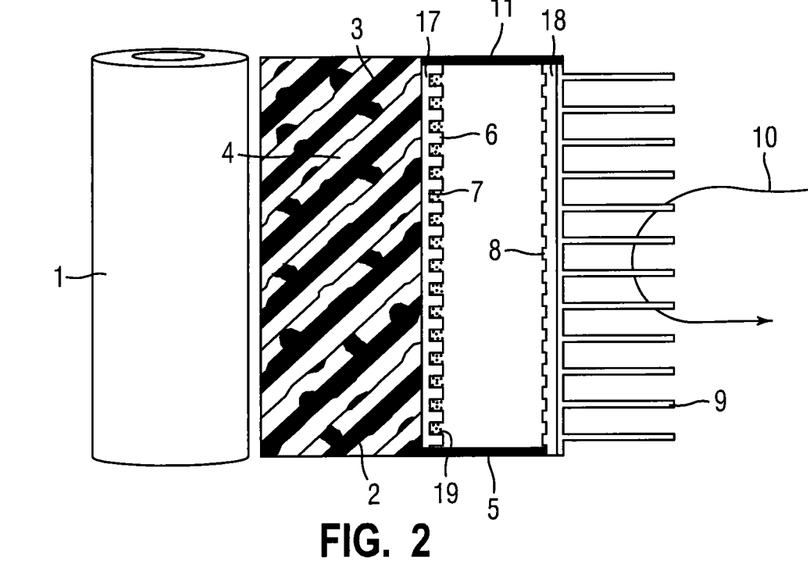
FIG. 2 shows a schematic view of the arrangement of the components of the thermal management system according to an embodiment of the disclosure.
Figure 4:
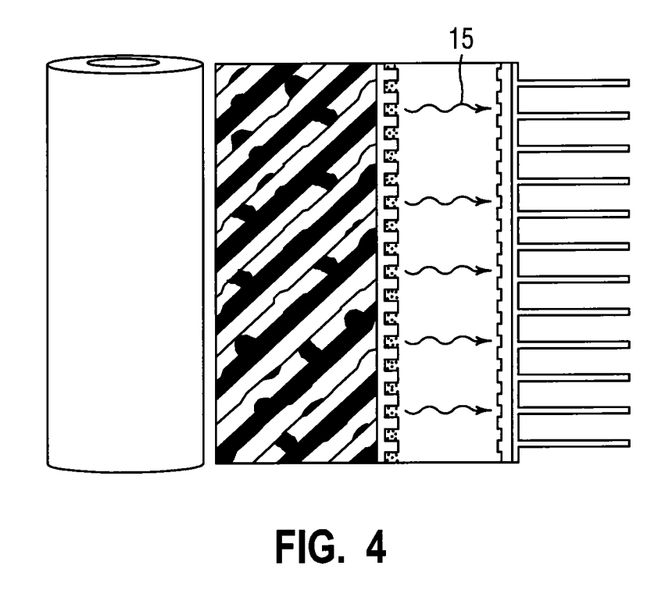
FIG. 4 shows a schematic illustration of heat flow from the casing of the porous thermally conductive framework through the heat flux rectifier.
Figure 5:
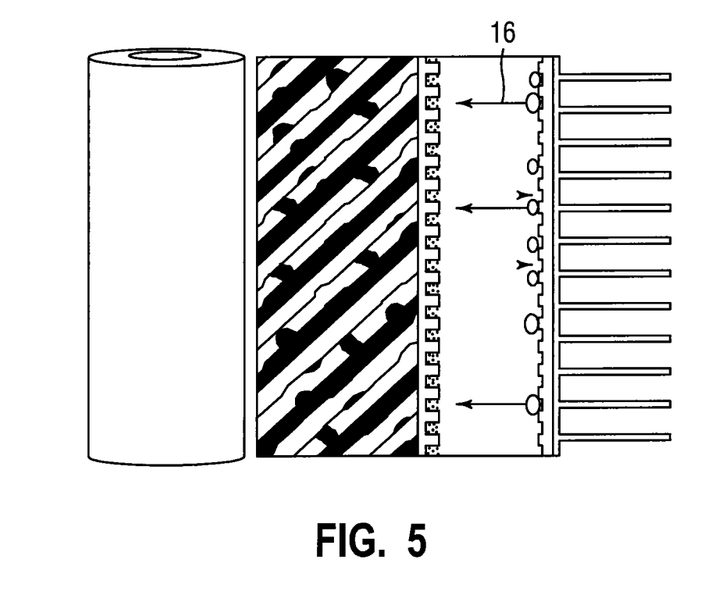
FIG. 5 shows a schematic illustration of solvent coolant returning to the superhydrophilic surface of the heat flux rectifier.

FIG. 2 shows a schematic diagram of the thermal management system with the arrangement of the described components. FIGS. 3, 4, and 5 are schematic diagrams showing various aspects of the disclosure as described. A key to FIGS. 2-5 is listed below.

KEY TO FIGS. 2-5

1 ENERGY UNIT
2 PF/PCM CASING
3 POROUS THERMALLY CONDUCTIVE FRAMEWORK
4 PHASE CHANGE MATERIAL (PCM)
5 HEAT FLUX RECTIFIER
6 SUPERHYDROPHILIC SURFACE
7 SOLVENT COOLANT
8 SUPERHYDROPHOBIC SURFACE
9 COOLING FINS
10 FLUID COOLANT
11 VACUUM SEAL GASKET
12 TEMPERATURE SENSOR
13 THERMAL HEATING UNIT
14 THERMALLY CONDUCTIVE METAL FOIL
15 SOLVENT COOLANT VAPOR MOVEMENT FROM HIGH TEMPERATURE SUPERHYDROPHILIC SURFACE TO SUPERHYDROPHOBIC SURFACE
16 SOLVENT COOLANT DROPLETS FORMED AT LOW TEMPERATURE SUPERHYDROPHOBIC SURFACE RETURN TO SUPERHYDROPHILIC SURFACE
17 SUPERHYDROPHILIC PLATE
18 SUPERHYDROPHOBIC PLATE
19 CAPILLARY

The functional aspect of the heat flux rectifier is described below with reference to the Figs.

Placing the heat flux rectifier (5) adjacent to and in direct thermal contact with the outer surface of the PCM/PF casing (2) effectively provides a thermal switch in the system which controls the removal or retention of thermal energy from the battery pack. The heat flux rectifier effectively functions: 1) as a thermal transfer system when the temperature of the superhydrophilic surface (6) is higher than the boiling point of the solvent coolant (7) within the chamber and the temperature of the superhydrophobic surface (8) is lower than the superhydrophilic side; 2) as an insulator when the superhydrophobic side temperature is higher than the superhydrophilic side (reverse mode); and 3) as an insulator when the temperature of the superhydrophilic side is lower than the boiling point of the coolant within the vapor chamber. The boiling point of the coolant within the rectifier may be adjusted by vacuuming the chamber to different pressures. The heat flux rectifier is provided with a vacuum seal gasket (11) to allow formation of and retention of a partial vacuum. By vacuuming the vapor chamber to a pressure at which the boiling point of the coolant is equal to or slightly lower than the fusion point of the PCM (4), when the PCM, which is in contact with the superhydrophilic side of the vapor chamber, starts melting or gets close to melting, the heat flux rectifier will be activated and conduct heat to the superhydrophobic side, which may then be dissipated to the environment by a conventionally known system such as, for example, a conventional fin structure (9) in a fan propelled air flow system (10).

Before the PCM starts melting, most of the heat will be accumulated within the PCM/PF casing as the vapor chamber of the heat flux rectifier works as an insulator because the two surfaces of the chamber are separated by a partial vacuum pocket and the gasket seal separating the surfaces is made of a material of low thermal conductivity. Before the heat flux rectifier is activated, the fan, if present, for the air cooling can be shut down to save energy or bypass all the cool air to the cabin to increase the passengers' comfort. The insulation provided by the heat flux rectifier allows the battery to reach an optimum operation temperature more quickly, which is especially important in winter, i.e., when the vehicle is not running, the rectifier will close the thermal pass between the PCM/PF casing and environment and the thermal energy is stored in the form of the latent heat of the PCM, thus providing retained thermal energy to the battery pack at next cold start.

Additionally, in a warm environment such as during the summer months, when the vehicle is exposed to solar thermal energy, the battery pack outside temperature may be higher than the melting point of the PCM. However, due to the insulation provided by the heat flux rectifier unit, heat transfer won't be activated because the superhydrophobic side temperature is higher than the superhydrophilic side of the heat flux rectifier and the battery pack is thus shielded from the external heat.

According to an embodiment the heat flux rectifier structure in contact with the PCM/PF casing contains a plurality of individual heat flux rectifier units organized side by side in a layer to effectively cover the outer surface of the PCM/PF casing. According to this embodiment, each heat flux rectifier may be activated separately and if there is a local hot spot on the PCM/PF casing the heat flux rectifier at that place will be activated. This structure efficiently addresses the formation of local hot spots and maintains uniformity of the temperature throughout the battery pack.

Also, in a special variant of the embodiment, a temperature sensor (12) (FIG. 3) and thermal heating unit (13) (FIG. 3) may be included in the thermal management system. In an embodiment having this element the thermal sensor may be embedded in the PCM/PF casing close to the energy unit. If the vehicle has not been in service for a long time, before charging the battery, the heater may be activated first to make sure the battery pack is charged at its optimum temperature. Since the heat flux rectifier layer acts as an "insulator" only a small amount of the PCM closest to the battery pack may be heated to increase the battery pack temperature.

The operational mechanism of the heat flux rectifier may be based on jumping droplet enhanced condensation cooling as shown in FIGS. 4 and 5. The rectifier may serve two functions: (1) as a thermal switch which promotes low thermal conductivity at low temperature and high thermal conductivity at high temperature with a possible thermal switch ratio around 100 times; and (2) as a thermal diode to transfer heat away from the PCM/PF casing. Thus the heat flux rectifier has a preferred direction for heat transfer. The thermal rectification/diodicity between forward and reverse directions can be up to 100 times depending on the $\Delta T$ between the superhydrophobic and superhydrophilic sides.

The basic structure of a heat flux rectifier contains a planar vapor chamber with opposing superhydrophobic and superhydrophilic plates. As shown in FIG. 2, the inside plate (17) of the chamber has a superhydrophilic inside surface (6) while the outside plate (18) has a superhydrophobic inside surface (8). The plates are separated by a thermally insulating gasket (11) which also provides a vacuum seal. A coolant solvent (7) is placed within the vacuum chamber and under thermal conditions where the temperature of the superhydrophilic surface is lower than the boiling point of the coolant, such as for example, water, the water collects at the superhydrophilic plate. As shown in FIG. 2, the surface structure of the superhydrophilic plate contains capillaries (19) or channels which are occupied by the water.

When the superhydrophilic surface is at a higher temperature with respect to the superhydrophobic one, the evaporating solvent coolant attractively associated with the superhydrophilic surface through polarity or hydrogen bonding carries heat away from the superhydrophilic surface (15) (FIG. 4), traverses to the superhydrophobic surface side and the vapor condenses on the superhydrophobic surface. When the vapor reaches and condenses on the opposite superhydrophobic surface, the droplets jump away from the surface during coalescence due to the release of surface energy. The self-propelled jumping motion returns the condensed drops back to the superhydrophilic surface (16) (FIG. 5) where evaporation again may occur, completing the circulation of working fluid with highly effective phase-change heat transfer. When the superhydrophilic surface is cooler, liquid coolant remains associated with the superhydrophilic surface and no phase-change heat transfer takes place (reverse mode). Therefore, a thermal rectification in forward and reserve operation modes can be expected. The wick structure formed by the capillaries or channels serves to evenly distribute the working liquid within the superhydrophilic surface and hold it against gravity. Detailed description of this structure and function is provided by Boreyko et al. (Applied Physics Letters, 99, 234105).

The forward mode of the heat flux rectifier is used for battery thermal management, so that the rectifier works like a thermal switch and, in the meantime, can shield the battery pack from external heat. When the temperature is too low for the coolant to evaporate, the superhydrophilic surface and the superhydrophobic surface side are separated by a partial vacuum pocket, and therefore, thermal transfer in the forward thermal conductivity is low and heat transfer between two surfaces is limited. The vapor chamber works like a thermal barrier to confine heat inside to promote rapid warm-up to an operating temperature. At elevated temperature, the heat transfer between two surfaces is enhanced by coolant evaporation and condensation, and hence the effective forward thermal conductivity can be orders of magnitude higher, resulting in fast heat release.

Another advantage of this jumping droplet based heat flux rectifier is that the thermal switch temperature can be tuned by controlling the pressure inside the vapor chamber during the packaging process.

As previously described, the key to making droplets "jump" is the material/surface of the superhydrophobic planar surface. The surface must be both superhydrophobic and nanostructured. The principle for the coolant droplet to jump is due to the release of excess surface energy to kinetic energy. The nanostructured superhydrophobic surface beneath the coalescing droplets can reduce the droplet adhesion to the substrate by minimizing the solid fraction.

The coolant solvent may be any solvent capable of functioning in a cyclic phase change system of the heat flux rectifier. Useful materials include water, ammonia, an organic liquid capable of acting as a refrigerant or refrigerants conventionally employed in air conditioning systems. An example of an organic fluid may be 1,1,1,3,3-pentafluoropropane such as available from Linde Industrial Gases under the name R245fa. Other refrigerant materials suitable as a solvent coolant for a heat flux rectifier will be known to one of skill in the art. Due to its high latent heat of vaporization, safety, cost and availability, water may be the preferred coolant.

Although heat flux rectifier units may be constructed to be of any size consistent with application to the surface of the PCM/PF casing, in general, individual units may range in area size from 1 $cm^2$ to 100 $cm^2$. The heat flux rectifier may be formed in any shape and may preferably be square or rectangular. The height or depth of the rectifier unit may be from 0.5 cm to 2.0 cm.

There are many materials that may be suitable for utility as superhydrophobic nanostructured surfaces. The very earliest studies on jumping droplets utilized lithography and cleanroom environment to fabricate nanostructures on the superhydrophobic surface. Recently, nanostructured surfaces are fabricated by a more cost-effective and scalable method by using self-assembly method. The salinized copper oxide (CuO) superhydrophobic surfaces show superior dropwise condensing properties, more specifically for low heat fluxes application. In addition, vertically aligned nanotube forest has an even smaller structural scale, and since the length scale could be engineered to be even smaller than 10 nm or less so that the nucleation density can be reduced at elevated supersaturations. By combining, lithography, self-assembly and functionalization of nanotube and graphene, it is potentially possible to develop cost-effective way to fabricate nanostructured superhydrophobic surface with enhanced dropwise condensation performance.

Thus, as described, an embodiment of the present disclosure is a method for thermal management of an energy unit comprising absorption of heat from the energy unit within a phase change material, transfer of the heat energy from the phase change material through a heat flux rectifier and removal of the heat transferred across the heat flux rectifier via heat exchange with an external fluid; wherein the flow of heat across the heat flux rectifier is irreversible and the heat flux rectifier acts as an on/off switch to control heat flow.

The thermally managed electrical supply unit described in the embodiments and variants above may be especially useful as a power system for an electric vehicle (EV) or hybrid electric vehicles (HEV). In one embodiment the fluid cooling of the fin structure of the vapor chamber thermal diode is cooled by passive air flow or by a fan positioned to blow air across the system. In special variants the fluid cooling system may be an air flow system which is interconnected with or a part of the cabin cooling system.

The invention claimed is:

1. A thermally managed electrical supply unit, comprising:
an energy unit comprising a battery, a battery pack or a fuel cell;
a casing of a thermally conductive framework having pores and a phase change material (PF/PCM) on at least one surface of the energy unit which provides heat transfer from the energy unit;
at least one heat flux rectifier unit in direct thermal contact with the casing of thermally conductive framework and phase change material which provides heat transfer from the PF/PCM casing; and
an external environment cooling system on at least one surface of the at least one heat flux rectifier which provides heat transfer from the heat flux rectifier, the surface being opposite to the PF/PCM casing;
wherein
the phase change material is within the pores of the thermally conductive framework,
the at least one heat flux rectifier unit provides a thermal switch between heat transfer from the PF/PCM or insulation of the PF/PCM which controls removal or retention of thermal energy from the energy unit, and
the external environment cooling system on at least one surface of the at least one heat flux rectifier comprises at least one selected from the group consisting of contact with a supply of a fluid coolant flow across the surface, convection cooling to an environment of the thermally managed electrical supply unit and radiant heat loss.

2. The thermally managed electrical supply unit of claim 1, wherein the casing of porous thermally conductive framework surrounds and encloses the energy unit.

3. The thermally managed electrical supply unit of claim 2 wherein the at least one heat flux rectifier unit comprises a layer of a plurality of individual heat flux rectifier units in direct thermal contact with the surface of the casing of porous thermally conductive framework away from the energy unit.

4. The thermally managed electrical supply unit of claim 1, wherein the external environment cooling system comprises a fluid coolant flow across the surface of the heat flux rectifier and the fluid coolant is selected from the group of fluids consisting of air, an inert gas and a noncorrosive liquid.

5. The thermally managed electrical supply unit of claim 1, wherein the heat flux rectifier unit comprises a vacuum sealed chamber having a superhydrophilic side which contacts the outer surface of the PCM/PF casing, a superhydrophobic side, a solvent coolant in the chamber and an at least partially evacuated space between the superhydrophilic side and the superhydrophobic side.

6. The thermally managed electrical supply unit of claim 1, wherein a melt temperature of the phase change material (PCM) is from 20° C. to 80° C.

7. The thermally managed electrical supply unit of claim 6, wherein the phase change material is a paraffin, a fatty acid or a fatty alcohol.

8. The thermally managed electrical supply unit of claim 1 wherein the porous framework is at least one selected from the group consisting of a foam of a thermally conductive metal, a foam of a graphite, a honeycomb of a thermally conductive metal and a graphite honeycomb.

9. The thermally managed electrical supply unit of claim 5, wherein the coolant solvent comprises at least one selected from the group consisting of ammonia, an organic liquid refrigerant, a refrigerant and water.

10. The thermally managed electrical supply unit of claim 5, wherein the coolant solvent is water.

11. The thermally managed electrical supply unit of claim 3 wherein the layer of a plurality of individual heat flux rectifier units arranged on the surface of the casing away from the energy unit covers all surfaces of the casing of porous thermally conductive framework.

12. The thermally managed electrical supply unit of claim 1, further comprising a temperature sensor and thermal heating unit within the PCM/PF casing.

13. The thermally managed electrical supply unit of claim 1, further comprising a thermally conductive metal foil or metal sheet on at least one surface of the PCM/PF casing.

14. A method for thermal management of an energy unit according to claim 1, comprising:
removing heat from the energy unit by absorption within the casing of a thermally conductive framework and phase change material;
transfer of the heat energy from the casing of a thermally conductive framework and phase change material through the heat flux rectifier unit; and
removal of the heat energy transferred across the heat flux rectifier unit by the external environment cooling system;
wherein the flow of heat across the heat flux rectifier unit is irreversible and the heat flux rectifier unit acts as an on/off switch to control heat flow.

15. The method for thermal management of an energy unit of claim 14, wherein the external environment cooling system comprises at least one selected from the group consisting of a fluid coolant flow across the surface of the heat flux rectifier, convection cooling from an outer surface to an environment of the thermally managed electrical supply unit and radiant heat loss.

16. The method for thermal management of an energy unit of claim 15, wherein the external environment cooling system comprises a fluid coolant flow across the surface of the heat flux rectifier unit and the fluid coolant is selected from the group of fluids consisting of air, an inert gas and a noncorrosive liquid.

17. The method for thermal management of an energy unit of claim 14, wherein the transfer of heat energy across the heat flux rectifier unit comprises evaporation of a solvent coolant from a superhydrophilic surface adjacent to and in thermal contact with the phase change material, movement of the coolant vapor to an opposing superhydrophobic surface which is at a temperature lower than the temperature of the superhydrophilic surface, condensation of the coolant vapor to droplets on the superhydrophobic surface, and jumping of the coolant droplets back to the superhydrophilic surface.

18. The method of claim 17 wherein when the temperature of superhydrophilic surface is lower than the temperature of the superhydrophobic surface the coolant is retained within pores or capillaries on the superhydrophilic surface.

19. The method of claim 17, wherein the solvent coolant is selected from the group consisting of water, ammonia, an organic liquid capable of acting as a refrigerant and refrigerants.

* * * * *